(12) United States Patent
Stumphauzer (10) Patent No.: US 9,884,333 B2
(45) Date of Patent: Feb. 6, 2018

(54) SELF-FOAMING HOT MELT ADHESIVE COMPOSITIONS AND METHODS OF MAKING AND USING SAME

(71) Applicant: William C. Stumphauzer, Avon, OH (US)

(72) Inventor: William C. Stumphauzer, Avon, OH (US)

(73) Assignee: Foammatick, LLC, Naples, FL (US)

( * ) Notice: Subject to any disclaimer, the term of this patent is extended or adjusted under 35 U.S.C. 154(b) by 0 days.

(21) Appl. No.: 15/500,747

(22) PCT Filed: Aug. 17, 2015

(86) PCT No.: PCT/US2015/045566
§ 371 (c)(1),
(2) Date: Jan. 31, 2017

(87) PCT Pub. No.: WO2016/028708
PCT Pub. Date: Feb. 25, 2016

(65) Prior Publication Data
US 2017/0216860 A1    Aug. 3, 2017

Related U.S. Application Data

(60) Provisional application No. 62/038,321, filed on Aug. 17, 2014.

(51) Int. Cl.
*B67D 1/00*      (2006.01)
*B67D 7/14*      (2010.01)
(Continued)

(52) U.S. Cl.
CPC ............ *B05B 7/168* (2013.01); *B05B 7/0025* (2013.01); *C08J 9/103* (2013.01); *C09J 7/0203* (2013.01);
(Continued)

(58) Field of Classification Search
CPC .............................. B05B 7/165; B05B 7/0025
(Continued)

(56) References Cited

U.S. PATENT DOCUMENTS 3,411,967 A    11/1968   Rowland et al.
3,982,669 A *   9/1976   Moore .................. B29B 13/022
                                                        222/146.5

(Continued)

FOREIGN PATENT DOCUMENTS

EP            0379908 A2    8/1990

*Primary Examiner* — Vishal Pancholi
(74) *Attorney, Agent, or Firm* — Rankin, Hill & Clark, LLP (57) ABSTRACT

The present invention relates to self-foaming hot melt adhesive compositions and methods of making and using the same. Self-foaming hot melt adhesive compositions are formed by admixing a dispersion concentrate including a chemical blowing agent and a compatible carrier (liquid or molten) with a molten base hot melt adhesive composition at a temperature below the decomposition temperature of the chemical blowing agent. The resolidified material is processed through a device that heats the material above the decomposition temperature of the chemical agent and cools it below such temperature before being dispensed. The device preferably includes sensors and a controller configured to prevent the material from accumulating an adverse thermal history during processing.

4 Claims, 4 Drawing Sheets

(51) Int. Cl.

| | | |
|---|---|---|
| *B67D 7/80* | (2010.01) | |
| *B05B 7/16* | (2006.01) | |
| *B05B 7/00* | (2006.01) | |
| *C09J 7/02* | (2006.01) | |
| *C09J 9/00* | (2006.01) | |
| *C09J 11/06* | (2006.01) | |
| *C08J 9/10* | (2006.01) | |
| *C09J 201/00* | (2006.01) | |
| *G05D 23/19* | (2006.01) | |

(52) U.S. Cl.
CPC ............... *C09J 9/00* (2013.01); *C09J 11/06* (2013.01); *C09J 201/00* (2013.01); *G05D 23/1902* (2013.01); *G05D 23/1917* (2013.01); *C08J 2400/12* (2013.01)

(58) Field of Classification Search
USPC ............ 222/54, 59, 64, 146.1, 146.2, 146.5, 222/146.6
See application file for complete search history.

(56) References Cited

U.S. PATENT DOCUMENTS

| | | | |
|---|---|---|---|
| 4,059,466 A | | 11/1977 | Scholl et al. |
| 4,395,968 A | * | 8/1983 | Wahnschaff .......... B05C 1/0813 118/202 |
| 4,545,504 A | | 10/1985 | Fabel et al. |
| 4,567,223 A | | 1/1986 | Ames |
| 4,850,425 A | * | 7/1989 | Anderson ............. B29B 13/022 165/65 |
| 5,252,617 A | | 10/1993 | Werner et al. |
| 6,095,803 A | * | 8/2000 | Slater .................. B05C 11/1042 222/146.2 |
| 8,348,100 B2 | * | 1/2013 | Kufner ................ B05C 11/1042 118/59 |
| 8,453,880 B2 | * | 6/2013 | Saidman ................ B05C 5/001 222/146.2 |
| 2008/0302477 A1 | * | 12/2008 | Varga ...................... B05C 5/001 156/304.1 |
| 2013/0112710 A1 | * | 5/2013 | Ross ......................... F24F 7/00 222/146.5 |
| 2013/0137794 A1 | | 5/2013 | Kasper et al. |
| 2015/0322301 A1 | | 11/2015 | Ellis et al. |

* cited by examiner

SELF-FOAMING HOT MELT ADHESIVE COMPOSITIONS AND METHODS OF MAKING AND USING SAME

BACKGROUND OF INVENTION

Field of Invention

The present invention relates to self-foaming hot melt adhesive compositions and methods of making and using the same. More particularly, the invention relates to self-foaming thermoplastic hot melt compositions, methods of manufacturing a self-foaming thermoplastic hot melt compositions, processing apparatus for activating self-foaming thermoplastic hot melt compositions and methods for adhesively bonding one or more substrates together using self-foaming thermoplastic hot melt compositions.

Brief Description of Related Art

Foamed adhesives have closed cell gas bubbles uniformly distributed throughout the matrix. There are numerous benefits to the use of foamed hot melt adhesives including reduced adhesive consumption for equivalent bond performance, longer adhesive open time, lower BTU content per equivalent volume of adhesive, decreased weight per bond leading to lower cost and lower energy consumption. Various foam hot melt compositions and methods of making same are described including, for example, in U.S. Pat. Nos. 4,200,207, 4,059,714, 4,059,466, 4,555,284 and in WO 2013/078446.

A known method to produce hot melt foam is to meter and mix an inert gas into the molten hot melt at elevated pressure, for example, 300 psi and above. The gas dissolves into the hot melt under pressure but creates foam when the molten material is dispensed from the pressurized dispensing equipment into standard atmospheric pressure. Unfortunately, this mechanical process does not produce consistent and uniform foam density.

U.S. Pat. No. 4,059,714 teaches use of a pump as described in U.S. Pat. No. 4,200,207. This pump has two stages wherein a gas is supplied to the second stage to be mixed with hot melt, pressurized, and ultimately produce foamed hot melt when dispensed into atmospheric pressure. In practice, it is known that cavitation occurs in the second stage of the pump, which causes it to wear rapidly. As the pump wears, the quality and density of the foam decreases, thus requiring frequent costly repair or replacement of the pump. This process requires a recirculating loop that returns undispensed hot melt to the second stage of the pump. Recirculation is achieved with heated return hoses which are expensive and cumbersome. Material being returned to the second stage of the pump contributes to the cause of non-uniform foam density.

U.S. Pat. No. 4,059,466 describes the benefits of foamed hot melt in detail. The claims of this patent define a method of bonding with thermoplastic adhesive by "heating solid thermoplastic adhesive and a blowing agent", then pressurizing said material, heating it to the decomposition temperature of the blowing agent then dispensing the molten hot melt into standard atmospheric pressure wherein it expands into a closed cell foam. This process is not used in industry and has not gained commercial acceptance due to several technical obstacles, including:

a) The solid thermoplastic adhesive granulate and the blowing agent powder exists in extremely different particle sizes. When these components are mixed together the powdered blowing agent is randomly distributed throughout the hot melt granulate. Therefore, some portions of the hot melt have no blowing agent while other portions have very high concentrations of blowing agent. The non-uniform distribution of blowing agent causes extreme variability in foam density making it commercially unacceptable. Those portions of hot melt with a high concentration of blowing agent expands in such great volume that they cause the foam to collapse and also produce air gaps and voids in the extrudate. Similarly, portions of the hot melt with no blowing agent do not foam at all.

b) The blowing agent powder settles by gravity making direct contact with the heated tank floor and tank walls. Some of this blowing agent powder decomposes even before the granulate hot melt becomes molten. This further contributes to unacceptable foam uniformity in commercial use.

c) U.S. Pat. No. 4,059,466 describes a melt temperature of 250° F. for the hot melt blowing agent powder mix. This is an impractically low temperature to accommodate high speed automatic application of hot melt adhesives. At 250° F., the melt rate of most hot melts is below the demand rate of automated production lines.

d) Hot melt application equipment is generally accessible to production line personnel. It is common place for these individuals to change equipment, temperature and pressure settings. The blowing agent specified in this patent begins to decompose and generate gas at temperatures of 350° F. and above. As shown on FIG. 1, which is a publicly available graph showing the decomposition rate of azodicarbonamide (CELOGEN AZ-130) in dioctyl phalathate, the decomposition rate is a function of time-at-temperature. The method disclosed in this patent has no provision to monitor the accumulated thermal history of the molten hot melt blowing agent mix. Therefore, when the accumulated thermal history reaches the decomposition point, hot melt foam will be generated in a melt tank open to atmosphere. When foam expansion occurs in the melt tank, the foam overflows from the tank contaminating the surrounding area presenting dangerous burn hazards and incinerating electronic controls.

U.S. Pat. No. 4,059,466 also describes a method of producing a hot melt foam by first heating solid hot melt particles and a blowing agent powder blend to a temperature at which the blend becomes molten, but below the decomposition temperature of the blowing agent (T-1), then pumping and pressurizing said molten composition through a heat source to increase its temperature to the decomposition temperature of the blowing agent (T-2), then dispensing said composition into atmospheric pressure upon which it expands into a hot melt foam. This patent specifies an adhesive application temperature of approximately 375° F., which is below the temperature needed to decompose 100% of the blowing agent. At 375° F., the amount of gas evolved will depend on the length of time the material is held at that temperature. Therefore, foam density will change when material consumption rates change.

Chemical blowing agents decompose to produce a gas at elevated temperatures. Decomposition rates are a function of time and temperature. As temperature increases, the length of time needed to activate and decompose the blowing agent decreases (see, e.g., FIG. 1).

Figure 1:
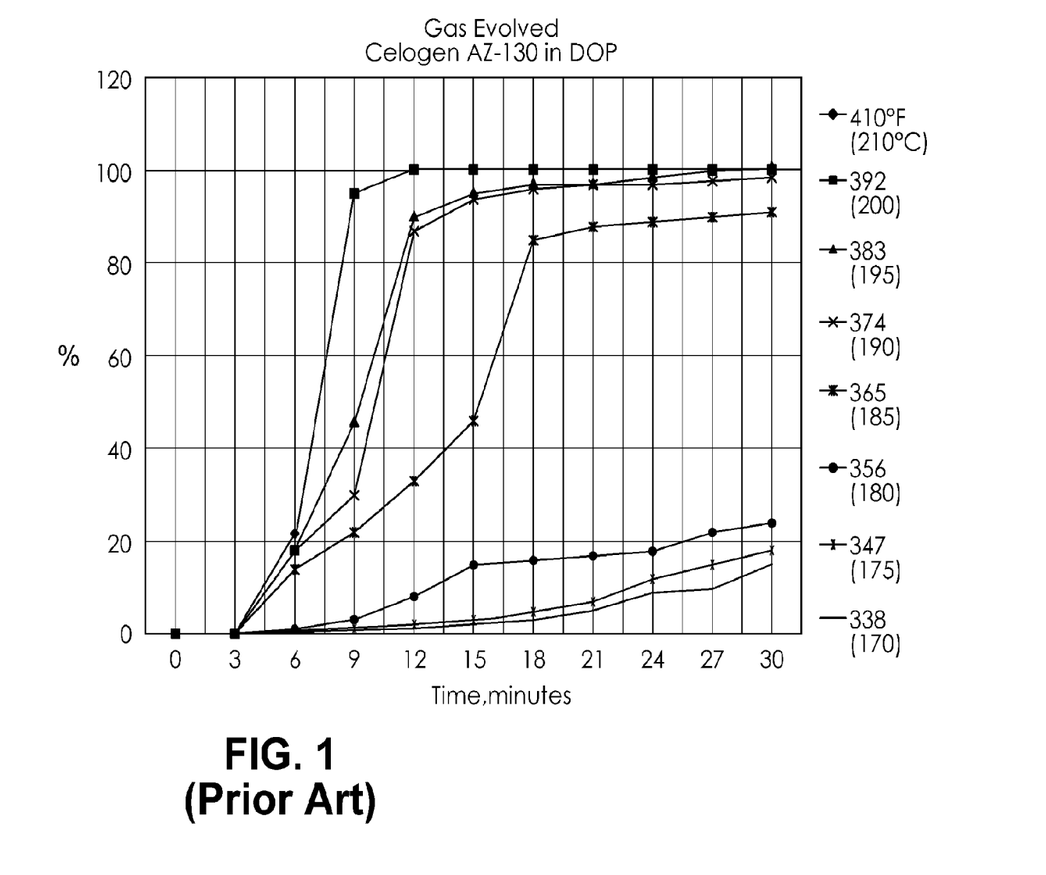
FIG. 1 is graph (prior art—publicly available) showing the decomposition rate of an azodicarbonamide (CELOGEN AZ-130) in dioctyl phalathate, in which the decomposition rate is shown as a function of time-at-temperature.

FIG. 1 reveals that at temperatures of 383° F. and below, not all of the azodicarbonamide decomposes, even after 30 minutes at temperature. Unless temperatures of 392° F. and above are achieved, the amount of azodicarbonamide that decomposes at lower temperatures will vary. Therefore, the foam density resulting from the volume of gas produced depends upon the length of time the material is held at any given temperature below 392° F.

In automated hot melt applications, the amount of hot melt consumed per unit time constantly changes as production lines change speed or during idle time; for example, to change dispensing nozzles, to fix line jams, for lunch breaks, or any other situation that interrupts the rate of material consumption.

Because of this variability in hot melt consumption, any decomposition temperature below 392° F. will result in inconsistent and changeable blowing agent decomposition and the amount of gas evolved. This, in turn, results in variability in the density of the hot melt foam produced. Variable foam density is unacceptable in automated hot melt production lines because variable volume of adhesive deposited could cause bond failure, changeable set time (too fast or too slow), and variable bond surface area.

Also, at temperatures of 375° F. and above, hot melt are subject to thermal degradation, loss of physical properties and lower adhesive performance. In addition, at these elevated temperatures most hot melts have a viscosity that is too low to support formation of acceptable foam due to cell coalescence, cell breakage and foam shrinkage.

BRIEF SUMMARY OF THE INVENTION

To avoid thermal degradation of self-foaming hot melt adhesive compositions that may occur at the elevated temperatures needed to achieve complete decomposition of the blowing agent, it is necessary to cool the hot melt. There are two conditions at which cooling the hot melt below the decomposition temperature of the blowing agent is necessary.

The first condition applies to the heating apparatus utilized to increase the temperature of the hot melt blowing agent admixture to the decomposition temperature of the blowing agent. Hot melt will begin to degrade if held at blowing agent decomposition temperatures for extended time periods which occurs if the rate of hot melt consumption slows or stops due to production line stoppages. When this happens, the temperature of the hot melt must be actively reduced.

The second condition under which the hot melt temperature should be lowered below the decomposition temperature of the blowing agent is prior to being dispensed onto the substrates being bonded. The hot melt deposition temperature must be low enough to prevent foam cell coalescence, cell breakage and foam shrinkage. The hot melt deposition temperature may be further reduced to decrease BTU content of the adhesive dispensed so that the time it takes to solidify and form a bond (set time) can be lessened.

The present invention provides simplified, cost-efficient methods to produce self-foaming hot melt adhesive compositions, and apparatus and methods for producing and dispensing the same. In one embodiment, the present invention provides a device with the dual capability of both heating and/or cooling molten hot melt. It functions to increase a molten admixture of hot melt and blowing agent to the decomposition temperature of the blowing agent and, when necessary, to decrease the temperature of hot melt to avoid thermal degradation and provide for optimal hot melt dispensing temperature.

In one embodiment of the invention, the surface of micronized blowing agent particles is coated prior to being incorporated into a hot melt material. Said coating is a liquid that is chemically compatible with the hot melt. The liquid coating prevents agglomeration of the micron-sized blowing agent particles and aids in its uniform distribution into the molten hot melt during its manufacture. Thus, in one embodiment, the invention includes surface coating the micronized blowing agent particles with one or more low viscosity ingredients of any given hot melt formulation at a temperature below the decomposition temperature of the blowing agent to form a concentrate, and then incorporating said blowing agent concentrate into the molten hot melt during its manufacture.

Another aspect of this invention is to monitor and control the temperature and thermal history of a self-foaming molten hot melt blowing agent admixture at the time of use, wherein the melt temperature and thermal history of the molten hot melt remains below the decomposition of the blowing agent prior to it being, pumped, pressurized and heated to a second temperature at which the blowing agent decomposes.

Yet another object of this invention is to provide a singular apparatus with the capability to heat a molten hot melt blowing agent admixture (T-1) to the decomposition temperature of the blowing agent (T-2) then to cool, the gas containing hot melt to a temperature below the decomposition temperature of the blowing agent (T-3), and then dispensing said gas containing hot melt into atmospheric pressure wherein it expands into a foam.

The present invention is also directed to the preparation of self-foaming hot melt adhesive materials, and a process to activate and dispense hot melt wherein it expands into a foamed hot melt adhesive. Self-foaming hot melts are made by first preparing a concentrate of micronized blowing agent powder by coating it with a liquid component or low viscosity molten component of a given hot melt formulation by utilizing high shear mixing. Said blowing agent concentrates are then admixed into a molten hot melt at a temperature below the decomposition temperature of the blowing agent at a final blowing agent concentration of 0.1 to 8.0 percent. This blowing agent dispersion concentrate is incorporated into the hot melt during its manufacture at a blending temperature below the decomposition temperature of the blowing agent. Incorporation of the blowing agent as a concentrated micronized dispersion with one of the formulation ingredients ensures uniform distribution of blowing agent particles in the hot melt. This process requires far less shear mixing that generates heat exposure and processing time that would otherwise be required if blowing agent powder were added directly to the molten hot melt ingredients during the normal hot melt manufacturing process. It also avoids premature decomposition of blowing agent that can occur with high shear mixing.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing figures, please note that.

DETAILED DESCRIPTION OF THE INVENTION

A self-foaming hot melt adhesive composition according to the invention comprises an admixture of a base hot melt adhesive composition and one or more chemical blowing agents. The term "base hot melt adhesive composition" refers to a hot melt composition to which the chemical blowing agent(s) is to be added. Preferably the chemical blowing agent is present at a concentration of from about 0.1% to 8.0% by weight of the admixture. More preferably, the chemical blowing agent is present between 1% and 2% by weight of the admixture.

The presently most-preferred chemical blowing agent for use in the invention is azodicarbonamide. However, other chemical blowing agents may be used including, for example, oxybis(benzenesulfonylhydrazide) (OBSH), toulenesulfonylhydrazide, trihydrazinotriazine, p-toulenesulfonyl semicarbazide (TSS), sodium bicarbonate and potassium bicarbonate.

Chemical blowing agents are supplied commercially in powder form in particle sizes ranging between 3 and 100 microns (i.e., a preferred range for use in the invention). These particles often stick together in clumps or agglomerates, which must be broken down before they are incorporated into self-foaming hot melt so as to prevent foam collapse, voids, and non-uniform density of the hot melt foam. Therefore, blowing agent particles must be coated with and dispersed into a carrier, which can be a liquid compatible with a given hot melt or a low viscosity, preferably below 1,000 centipoise, molten component of a given hot melt formulation. Said blowing agent can constitute from 5% to 70% by weight of the total blend, preferably 25% to 50%, of the dispersion concentrate. The dispersion concentrate is preferably prepared by slowly sifting the blowing agent powder into the liquid phase material while the liquid is being agitated at a minimum of 500 rpm, or preferably at 3,200 rpm, using commercially available high velocity mixers such as a Cowels Disperser. The time needed to break down blowing agent agglomerates depends on the specific blowing agent and its concentration as a percentage of the total dispersion. Commercially available, fineness of grind gauges may be used to determine when the dispersion is sufficiently blended. The fineness of grind gauge should reveal that the mean particle size in the dispersion is the same as the particle size specified by the blowing agent supplier.

Some compatible liquids that may be used to create micronized dispersions with blowing agents include mineral oil, napthenic oils and plasticizers. Some low viscosity molten hot melt ingredients used to prepare blowing agent dispersions are wax and tacifiers. Ideally, the viscosity of the finished dispersion would range in viscosity from 100 to 3,000 centipoise, but preferably less than 1,000 centipoise. Dispersions made with molten low viscosity components of a given hot melt should also have a viscosity between 100 and 3,000 centipoise, and preferably less than 1,000 centipoise, while in the molten state.

The dispersion concentrate of blowing agent and carrier is incorporated into the base hot melt adhesive composition when the latter is molten during normal mixing/blending processes utilized in the manufacture of conventional hot melt adhesives. The temperature of the hot melt during the process of dispersion incorporation must be lower than the decomposition temperature of the specific blowing agent. If the blowing agent dispersion concentrate is introduced to a hot melt batch at a temperature near or above the decomposition temperature of the blowing agent, unpredictable amounts of gas will be generated causing some foaming to occur in the hot melt mixing vessel. This would potentially ruin an entire production batch.

Because normal mixing procedures used to manufacture hot melt sometimes create heat, it is preferable to hold the hot melt temperature 5% to 10% below the decomposition temperature of the blowing agent while incorporating the blowing agent dispersion. For example: azodicarbonamide (AZ-130) begins to decompose at approximately 338° F. Thus, the temperature of the base hot melt batch to which it is introduced should not exceed about 320° F. Blowing agent benzenesulfonyl hydrazide (OBSH), begins to decompose at 302° F. Therefore, the temperature of the base hot melt batch should not exceed 280° F. while incorporating an OBSH blowing agent dispersion.

As noted above, mixing is conducted at high shear to ensure uniform distribution of the chemical blowing agent in the base hot melt adhesive composition. Once sufficient mixing has occurred, the material is cooled (actively or passively) and processed for end use (e.g., pelletized or placed into suitable containers such as drums, as is known in the art). This material may sometimes be referred to herein as a "self-foaming hot melt adhesive composition" and/or as a "blowing agent hot melt admixture."

It is well known in the hot melt industry that thermal degradation and the resulting loss of physical properties is a major problem in the process of melting and applying hot melt adhesives. Breakdown of the molecular chains develop as a result of laminar flow along the side walls of hot melt equipment and hoses. The thermal degradation process begins over time and is accelerated as temperatures increase, typically for most hot melts, above 350° F. This phenomenon is particularly amplified when hot melt blowing agent admixtures are heated to the higher temperatures necessary to decompose the blowing agent contained in the hot melt admixture. Therefore, to eliminate the potential development of the thermal degradation of hot melt in heat exchanger devices used to decompose blowing agents it is necessary to actively cool said heat exchanger to lower temperatures whenever material flow stops.

Figure 2:
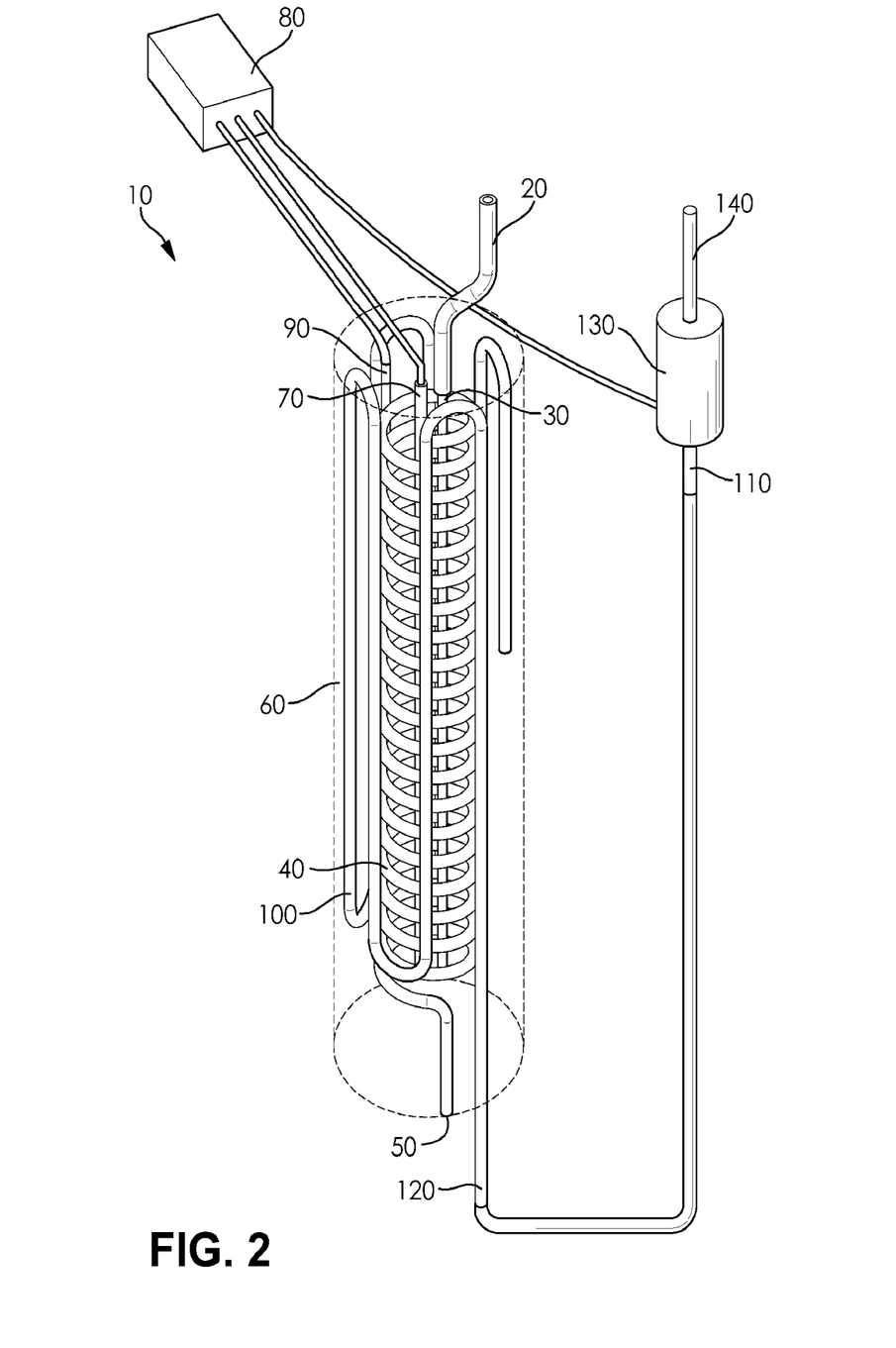
FIG. 2 is a perspective schematic view of an exemplary device for actively heating/cooling hot melt compositions in accordance with the invention.
Figure 3:
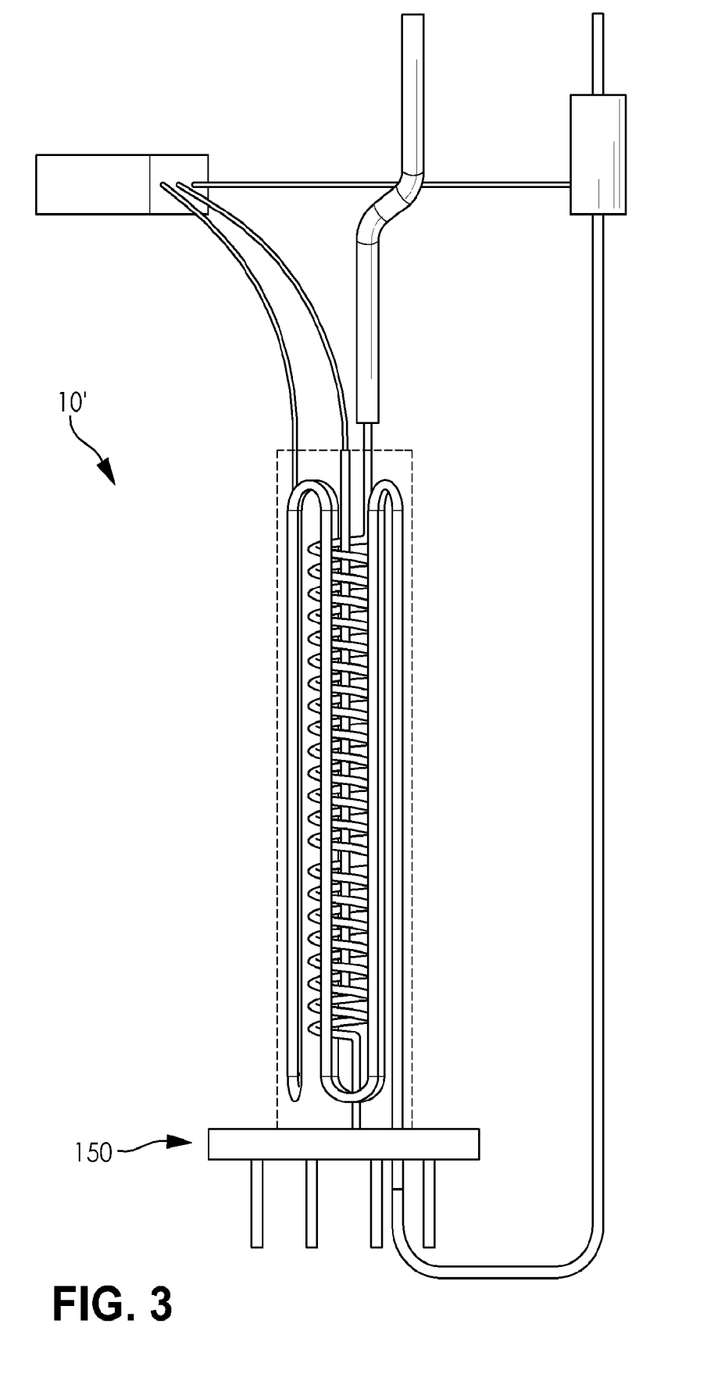
FIG. 3 is a side section view of a device similar to that shown in FIG. 2 to which is attached a manifold.
Figure 4:
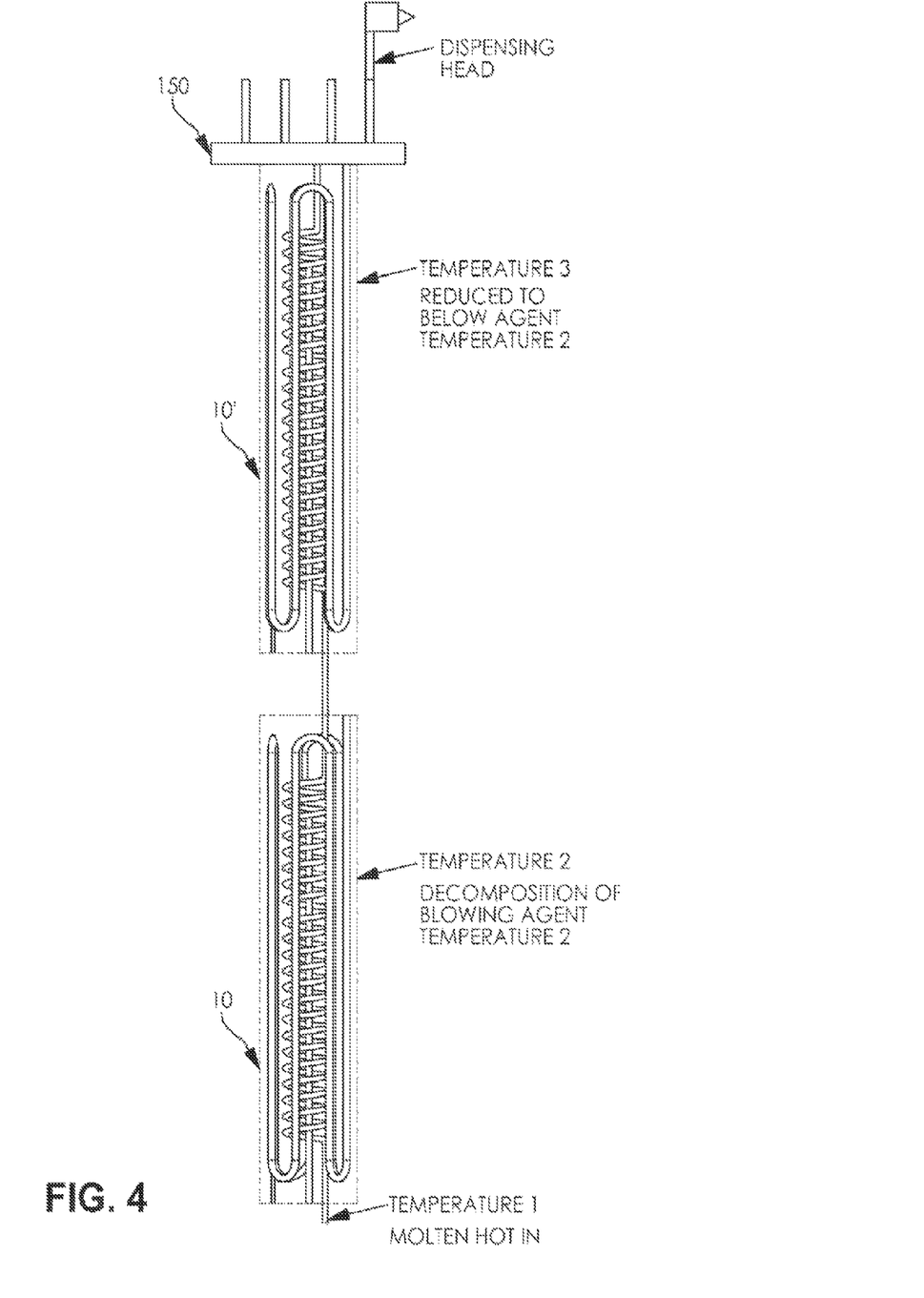
FIG. 4 is a side section view showing the devices shown in FIGS. 2 and 3 in series.

FIG. 2 illustrates an embodiment of the present invention, which is a device 10 that can actively heat or cool hot melt adhesive compositions. The device 10, which is sometimes referred to herein as a "heat exchanger", is connected to a hot melt hose 20 that supplies hot melt in a molten, but not activated, state from a source such as a melt kettle (not shown). The molten hot melt enters the device 10 through an inlet 30 and passes through a heat transfer coil 40. The hot melt is heated in the heat transfer coil 40 to its activation temperature (i.e., a temperature at which the chemical blowing agent complete decomposes into a gas). Decomposition of the chemical blowing agent causes the hot melt material to pressurize in the heat transfer coil 40. Once activated, the activated hot melt material flows out of an outlet 50 to another device 10' according to the invention (e.g., as shown in FIG. 4), to a manifold (e.g., as shown in FIG. 3), or directly to hot melt dispensing equipment.

The heat transfer coil 40 is encased within a body 60, which is preferably made of aluminum but could be made of other suitable materials. The body 60 also encases a heater 70, which supplies heat to heat the hot melt material in the heat transfer coil 40. The heater 70 is controlled by a controller 80, which energizes and de-energizes the heater 70 based on information or data received from a sensor 90.

The body 60 also encases a cooling coil 100. The cooling coil 100 receives cooling air or water (or other flowable cooling material) that is supplied by a cooling line 110 through a cooling inlet 120. Flow of the cooling material is controlled by a solenoid 130, which is in communication with the controller 80. When the temperature is determined to be too high in the body 60, the solenoid 130 opens allowing cooling material from a cooling material source (not shown) to flow from a cooling material supply line 140 through the solenoid, the cooling line 110 and cooling inlet 120 into the cooling coil 100 to cool the material in the heat transfer coil 40.

Thus, to use the device 10 shown in FIG. 2 a molten hot melt blowing agent admixture at a temperature below the decomposition temperature of the blowing agent T-1 is pumped under pressure through hot melt hose 20 to inlet 30 such that it then flows through heat transfer coil 40 before exiting through outlet 50. The molten material in the heat transfer coil 40, which is contained in the body 60, is heated to the decomposition temperature of the blowing agent, T-2, by heater 70, which is controlled by controller 80 in response to temperature data received from sensor 90. Hot melt containing dissolved gas at decomposition temperature T-2 exits the apparatus at outlet 50. Controller 80 monitors material flow in and out of heat transfer coil 40 utilizing software algorithms that detect the rate of temperature change as measured by sensor 90. When material flow stops for longer than predetermined programmed parameters known to cause thermal degradation of the hot melt, temperature controller 80 turns off electrical power to heater 70 and turns on electrical power to solenoid 130 causing cooling air or water to flow through cooling coil 100 lowering the temperature of the material in the heat transfer coil 40 within the body 60. This cooling mode continues until a pre-established cooling temperature is achieved. When temperature sensor 90 detects material flow has resumed, solenoid 130 is de-energized, cooling mode stops and heater 70 is powered on, returning the apparatus to heater mode.

It is also known in the art that foamed hot melt adhesives do not solidify or "set" as fast as unfoamed hot melt adhesives because the entrained gas cells act as insulators that slow the rate of heat loss. Therefore, a further advantage of a heat exchanger with the capability of both heating and cooling hot melt is that it can be used to cool activated hot melt material to any lower temperature thus reducing its BTU content so set time of the dispensed adhesive can be decreased as desired.

FIG. 3 shows a device 10', which is identical to that shown in FIG. 2 except that it operates to cool activated hot melt (e.g., as received from a device according to FIG. 2) before it is dispensed or deposited. Referring now to FIG. 3, hot melt under pressure containing entrained gas at T-2 is received through hose 20 (preferably heated) through inlet 30 and flows through heat exchange coil 40 until it exits through outlet 50. Again, the heat exchange coil 40 is encased within body 60. A heater 70 is present in the event that heat needs to be supplied to the material. But the device 10' is particularly configured to supply cooling material through cooling coil 100 to reduce the temperature of the activated hot melt material to the final desired hot melt deposition temperature. Sensor 90 communicates with controller 80 to determine the temperature of the material entering the body 60. If the hot melt material temperature introduced at or near inlet 30 is higher than the desired hot melt deposition temperature, sensor 90 communicates this information to controller 80, which responds by turning off power to heater 70 and turning on power to solenoid 130 causing cooling air or water to flow through cooling coil 100 until the desired hot melt deposition temperature is achieved. A manifold 150 is optionally connected at the outlet 50. The manifold 150 allows activated hot melt material at the predetermined dispensing temperature (T-3) to be supplied to a plurality of dispensers in fluid communication with the manifold 150.

The present invention is also directed to a method of controlling and monitoring the temperature and accumulated thermal history of a blowing agent hot melt admixture heated to become molten at a temperature below the decomposition temperature of the blowing agent in hot melt tanks or vessels that are open to atmosphere. As shown on FIG. 1, azodicarbonamide will begin to decompose at 338° F. in just 5 minutes. Blowing agent decomposition in vessels open to atmosphere are exothermic and self-accelerating. Once decomposition is initiated hot melt blowing agent admixtures have the potential to initiate foam expansion and over-flow from hot melt vessels or tanks, thus contaminating the surrounding area. This occurrence presents a burn hazard and housekeeping nightmare that is unacceptable in an industrial environment. If the accumulated thermal history of hot melt blowing agent admixtures held molten in open vessels is not monitored and controlled, premature decomposition of the blowing agent and foam overflow is likely to occur.

This invention provides an electronic control algorithm with temperature input provided by a sensor located in the melt vessel. Specific algorithms are based on the specific decomposition characteristics of the particular blowing agent admixture being monitored. In the specific case of azodicarbonamide (CELOGEN AZ-130), one suitable control algorithm program could be:

Hot melt temperature 325° F.—No action taken;
Hot melt temperature 330° F. and above for more than 10 minutes—System Alarm activated—if no corrective action is taken within 10 minutes of System Alarm, tank heater automatically shut down until material temperature drops to 325° F.;
Hot Melt temperature 340° F. and above for more than five minutes—System Alarm activated—if no corrective action is taken within 3 minutes of System Alarm, tank heater automatically shut down until material temperature drops to 325° F.; and
Hot Melt temperature 345° F. and above—Immediate System Alarm activated and tank heater shut down for 30 minutes or until material temperature drops to 325° F. or below.

It will be appreciated that the specific times and temperatures can be adjusted based on the composition of the material being utilized, the delay period before action desired, etc. In all of the noted fault conditions, the heater will be returned to Power ON only after the molten hot melt blowing agent admixture cools to a predetermined temperature below the decomposition time-temperature profile of the specific blowing agent in use.

Automated production lines must have consistent and uniform adhesive bead dimensions and adhesive volume applied to the substrates being bonded in order to ensure reliable adhesive bonds. When hot melt blowing agent admixtures are used to create hot melt foam, it is imperative that 100% of all blowing agent be decomposed before the adhesive is dispensed onto a substrate. Incomplete or variable blowing agent decomposition causes inconsistent foam density which is unacceptable in automated production lines.

As shown in FIG. 1, azodicarbonamide must reach a temperature of 392° F. or above for 11 minutes at atmospheric pressure to fully decompose. The decomposition rate of azodicarbonamide is accelerated if decomposition takes place in a hydraulically closed system wherein pressure and heat generated by the exothermic reaction add to the reaction rate. However, the temperatures required to achieve total decomposition as shown on FIG. 1 remain the same.

It is known that thermoplastic hot melts degrade and lose their physical properties when exposed to elevated temperatures for extended time periods. Therefore, it is necessary to limit the length of time a given amount of hot melt is held at blowing agent decomposition temperatures to avoid thermal degradation. The elevated temperature required to reach complete decomposition of the blowing agent is also the temperatures that will, over time, initiate thermal degradation of hot melt.

The rate of hot melt consumption in automated production changes and sometimes stops for unpredictable time intervals; for example, if a production line jams or during lunch break shift changes, overnight shutdown and so forth. When hot melt consumption stops, the material present in the apparatus used to increase the temperature of a hot melt blowing agent admixture to decomposition (T-2) should have the ability to discontinue heating and begin cooling the material to avoid thermal degradation in response to changes in hot melt consumption. This procedure also prevents char build-up; i.e., degraded hot melt, on the walls of the material flow path. Over time, char could build to restrict material flow. Char particles also break off and plug dispensing nozzles.

In order to eliminate the possibility of thermal degradation and also to provide the capability to reduce T-2 temperature prior to dispensing hot melt containing dissolved gas, the present invention utilizes an apparatus that has the dual capability to heat or cool hot melt flowing through it. They can be linked in series, as is shown in FIG. 4.

With reference to FIG. 4, molten hot melt below the decomposition temperature of the blowing agent (T1) is pumped into a first device 10, where it is heated to the decomposition temperature of the blowing agent (T-2). In normal production, the heated hot melt material continues to flow out of the first device 10 and into a second device 10', which cools the gas-containing hot melt to a temperature below the decomposition temperature of the blowing agent (T-3). However, if hot melt material flow stops due to line jams or other causes, the heater in the first device 10 is turned off and cooling air or water is introduced to cool the stagnant gas-containing hot melt to a lower temperature thereby preventing degradation of the hot melt. The controllers make appropriate temperature adjustments in the second device 10', as described below, during the period of shut-down. When normal production restarts and hot melt material begins to flow again, the controllers return the devices 10, 10' to their normal production state.

Thus, the first device 10 is configured to heat the hot melt material flowing through it to the decomposition temperature (T-2) in continuous flow production, but would enter into a cool mode if production flow stopped. The second device 10' in series would cool the material flowing through it from decomposition temperature (T-2) to the lower dispensing temperature (T-3) during normal continuous flow production, but would turn on the heater and maintain the temperature (T-3) for the material in the system until production restarts and newly heated material is flowing into the second device 10'. If production stops, then cooling on the second device 10' has to stop and heating has to be initiated to a hold temperature (T-3), otherwise material in the second device 10' would solidify. This circumstance can occur during line stops for lunch breaks etc. The use of two devices in series allows for higher throughout, while also allowing for interruptions during production.

The following examples are intended only to illustrate the invention and should not be construed as imposing limitations upon the claims.

EXAMPLE A-1

Formation of Blowing Agent Dispersion Concentrate—Liquid

A 30% concentration of azodicarbonamide (CELOGEN AZ-130) average particle size 10 microns from Galata Chemical, Danbury, Conn., admixed with Calumet Calsol 550 (hydro-treated naphthenic petroleum oil supplied by Calumet Specialty Products LLC, Indianapolis, Ind.) was prepared at room temperature using a high speed blender at 3,200 rpm for 8 minutes. The resulting dispersion had a viscosity of 1,200 centipoise.

EXAMPLE A-2

Formation of Self-Foaming Hot Melt Adhesive Composition

The blowing agent dispersion concentrate formed in Example A-1 was added and blended into a metallocen base hot melt adhesive composition obtained from H.B. Fuller at a temperature of 300° F., which is above the melt temperature of the base hot melt adhesive composition but below the decomposition temperature of azodicarbonamide. The precise composition of the base hot melt adhesive composition is proprietary to the manufacturer and is not known by applicant. The "let down" rate or finished blowing agent concentration for the mixture was 1.25% by weight. Mixing was accomplished using a 1 horsepower drill at 800 rpm with a 2½" spiral mixing head in a 12 quart mixing vessel for 5 minutes. The resulting material was poured into non-stick molds having approximate dimensions of 8"×4"×3", and allowed to cool and resolidify into a self-foaming hot melt adhesive composition.

EXAMPLE A-3

Activation and Use of Self-Foaming Hot Melt Adhesive Composition

The self-foaming hot melt adhesive composition from Example A-3 was melted in a LTI Dynatec hot melt tank at 320° F. Once molten, it was pumped at 400 psi through a heat exchanger such as shown in FIGS. 2 and 3 to elevate its temperature to 410° F., thereby decomposing all of the azodicarbonamide. It was then pumped through a cooling apparatus reducing its temperature to 350° F. and dispensed into atmospheric pressure producing a hot melt foam with a bulk density 50% below the bulk density of the identical hot melt without blowing agent. The dispensed hot melt foam was used to join combinations of the following substrates together (and to each other): cardboard; cereal box cartons; filter paper; beverage carton stock; and clay-coated craft paper. Room temperature tear tests on bonded substrates revealed 100% fiber tear on all surfaces in contact with the adhesive.

EXAMPLE B-1

Formation of Blowing Agent Dispersion Concentrate—Solid

A 30%, by weight, concentration of azodicarbonamide (GALATA CHEMICAL ACTAFOAM 130) in molten (200° F.) wax (CALUMET FR-6513) was prepared using a high speed blender at 3,200 rpm for 4 minutes. The resulting blowing agent concentrate was cooled to room temperature and solidified.

EXAMPLE B-2

Formation of Self-Foaming Hot Melt Adhesive Composition

The dispersion concentrate formed in Example B-1 was melt-blended into the molten ingredients of the same metallocene-based hot melt as used in Example A-2 at a "let down" finish concentration of 1.35%, by weight, azodicarbonamide. The same processing conditions and equipment as used in Example A-2 were used.

EXAMPLE B-3

Activation and Use of Self-Foaming Hot Melt Adhesive Composition

The self-foaming hot melt adhesive composition prepared in Example B-2 was melted in a LTI Dynatec Hot Melt Tank and processed in the same manner as in Example A-3. The resulting foam bulk density was 50% lower then the identical hot melt without blowing agent. The dispensed hot melt foam was used to join combinations of the following substrates together (and to each other): cardboard; cereal box cartons; filter paper; beverage carton stock; and clay-coated craft paper. Room temperature tear tests on bonded substrates revealed 100% fiber tear on all surfaces in contact with the adhesive.

EXAMPLE C-1

Formation of Blowing Agent Dispersion Concentrate—Liquid

Fifty percent concentration of azodicarbonamide (GALATA CHEMICAL ACTAFOAM AZ-130) admixed with medium weight generic mineral oil was prepared in a Hobart Planetary Mixer at 240 rpm for 10 minutes at room temperature. The resulting dispersion concentrate was a thick paste with a rheology similar to applesauce.

EXAMPLE C-2

Formation of Self-Foaming Hot Melt Adhesive Composition

The dispersion concentrate formed in Example C-1 was melt-blended into Bostik 55-606 pressure-sensitive hot melt adhesive at an zodicarbonamide "let down" concentration of 1.5% by weight. The mixing conditions and equipment used were the same as in Examples A-2 and B-2. The molten material was cooled to room temperature in solid cast blocks.

EXAMPLE C-3

Activation and Use of Self-Foaming Hot Melt Adhesive Composition

The self-foaming hot melt adhesive composition produced in Example C-2 was heated in a HMT (Hot Melt Technologies, Rochester, Mich.), hot melt tank and heated to a molten temperature of 310° F. The admixture was pumped and pressurized to 450 psi through a heat exchanger elevating the temperature to 400° F. and causing the blowing agent to fully decompose producing a nitrogen gas solution with the hot melt. This hot melt gas solution was pumped though a 12-foot hot melt hose at 350° F. cooling the material to 350° F. When dispensed into atmospheric pressure, the pressure-sensitive adhesive produced a foam with a bulk density 50% below the same hot melt without blowing agent. The material was used to bond the same substrates as in Examples A-3 and B-3. Room temperature tear tests on bonded substrates revealed 100% fiber tear on all surfaces in contact with the adhesive.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A device for activating and dispensing a self-foaming hot melt adhesive composition, comprising:
   an inlet for receiving a flow of molten self-foaming hot melt adhesive composition at a temperature that is below a decomposition temperature of a chemical blowing agent present in the self-foaming hot melt adhesive composition;
   a conduit in fluid communication with the inlet, said conduit being configured to contain the self-foaming hot melt adhesive composition at a pressure greater than atmospheric pressure, said conduit including an outlet;
   a heating jacket for heating the molten self-foaming hot melt adhesive composition in the conduit to or above an activation temperature at which the chemical blowing agent decomposes into a gas;
   a cooling jacket for cooling activated self-foaming hot melt adhesive composition in the conduit;
   a hot melt adhesive dispenser in fluid communication with the outlet of the conduit;
   a sensor for measuring a temperature of the activated self-foaming hot melt adhesive composition in the conduit; and
   a controller configured to control operation of the heating jacket and the cooling jacket based on the temperature of the activated self-foaming hot melt adhesive composition as measured by the sensor; and
   wherein the controller is configured to turn off power to the heating jacket and supply a cooling material to the cooling jacket based on the temperature of the activated self-foaming hot melt adhesive composition as measured by the sensor to prevent the activated self-foaming hot melt adhesive composition from accumulating an adverse thermal history while in the conduit.

2. The device according to claim 1, further comprising an integrated outlet manifold for one of more hot melt hoses.

3. The device according to claim 1, further comprising a body that encases the conduit, the heating jacket and the cooling jacket.

4. The device according to claim 3, wherein the body is made of aluminum.

\* \* \* \* \*